(12) United States Patent
Govindarajan et al.

(10) Patent No.: US 10,380,577 B2
(45) Date of Patent: *Aug. 13, 2019

(54) WIRELESS DONGLE FACILITATED MOBILE TRANSACTIONS

(71) Applicant: PAYPAL, INC., San Jose, CA (US)

(72) Inventors: Satish Narayan Govindarajan, San Jose, CA (US); John Hastings Granbery, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,654

(22) Filed: Sep. 19, 2016

(65) Prior Publication Data

US 2017/0011380 A1 Jan. 12, 2017

Related U.S. Application Data

(63) Continuation of application No. 14/629,379, filed on Feb. 23, 2015, now Pat. No. 9,471,917, which is a (Continued)

(51) Int. Cl.
*G06Q 40/00* (2012.01)
*G06Q 20/32* (2012.01)
*G06Q 20/20* (2012.01)
*G06Q 20/38* (2012.01)
*G06Q 30/02* (2012.01)
(Continued)

(52) U.S. Cl.
CPC ......... *G06Q 20/3224* (2013.01); *G06Q 20/20* (2013.01); *G06Q 20/202* (2013.01);
(Continued)

(58) Field of Classification Search
CPC .... G06Q 20/3278; G06Q 20/20; G06Q 20/32; G06Q 20/3274; G06Q 20/40;
(Continued)

(56) References Cited

U.S. PATENT DOCUMENTS 6,587,835 B1 7/2003 Trez et al.
6,711,474 B1 3/2004 Trez et al.
(Continued)

FOREIGN PATENT DOCUMENTS

CN 102822855 A 12/2012
WO 2010/109271 9/2010

OTHER PUBLICATIONS

NCR standardizes on inside out networks; USB connectivity software for retail point-of-service systems. (Jan. 14, 2000). Business Wire Retrieved from https://dialog.proquest.com/professional/docview/669611905?accountid=142257 on Feb. 25, 2019 (Year: 2000).*

(Continued)

*Primary Examiner* — Kito R Robinson
(74) *Attorney, Agent, or Firm* — Haynes and Boone, LLP

(57) ABSTRACT

Computing systems and methods for facilitating mobile transactions are disclosed. An example method includes: detecting, via a hardware communication interface, a user check-in request based at least on a communication exchange between a user device and a signaling device at a location. The communication exchange corresponds to a proximity of the user device to the signaling device. The method further includes: determining a user identifier associated with the user device based at least on the user check-in request; and transmitting one or more promotional items to the user device based at least on the user identifier.

20 Claims, 10 Drawing Sheets

Related U.S. Application Data continuation of application No. 13/938,860, filed on Jul. 10, 2013, now Pat. No. 8,972,296.

(60) Provisional application No. 61/747,918, filed on Dec. 31, 2012.

(51) Int. Cl.
*H04L 12/931* (2013.01)
*H04W 4/021* (2018.01)
*H04W 4/02* (2018.01)
*H04W 88/02* (2009.01)

(52) U.S. Cl.
CPC ............ *G06Q 20/32* (2013.01); *G06Q 20/322* (2013.01); *G06Q 20/327* (2013.01); *G06Q 20/3226* (2013.01); *G06Q 20/3278* (2013.01); *G06Q 20/3829* (2013.01); *G06Q 30/0261* (2013.01); *G06Q 30/0267* (2013.01); *H04L 49/201* (2013.01); *H04W 4/021* (2013.01); *H04W 4/023* (2013.01); *H04W 88/02* (2013.01)

(58) Field of Classification Search
CPC ........... G06Q 30/0238; G06Q 30/0267; G06Q 20/327; G06Q 20/36
USPC .......................................................... 705/39
See application file for complete search history.

(56) References Cited

U.S. PATENT DOCUMENTS

| | | | |
|---|---|---|---|
| 7,231,357 B1* | 6/2007 | Shanman | G06Q 20/387 705/14.23 |
| 8,045,961 B2 | 10/2011 | Ayed et al. | |
| 8,090,616 B2 | 1/2012 | Proctor, Jr. et al. | |
| 8,135,624 B1 | 3/2012 | Ramalingam et al. | |
| 8,321,246 B1* | 11/2012 | Shah | G06F 17/3087 705/5 |
| 8,346,672 B1 | 1/2013 | Weiner et al. | |
| 8,438,066 B1 | 5/2013 | Yuen et al. | |
| 8,498,900 B1* | 7/2013 | Spirin | G06Q 50/00 340/286.09 |
| 8,509,734 B1 | 8/2013 | Gupta et al. | |
| 8,625,796 B1 | 1/2014 | Ayed | |
| 8,682,802 B1 | 3/2014 | Kannanari | |
| 8,706,628 B2 | 4/2014 | Phillips | |
| 8,856,045 B1 | 10/2014 | Patel et al. | |
| 8,866,673 B2* | 10/2014 | Mendelson | G01C 21/206 342/386 |
| D717,309 S | 11/2014 | Govindarajan | |
| 8,972,296 B2 | 3/2015 | Govindarajan et al. | |
| 9,002,727 B2 | 4/2015 | Horowitz et al. | |
| 9,026,460 B2 | 5/2015 | Grigg et al. | |
| 9,177,315 B2 | 11/2015 | Pitroda et al. | |
| 9,264,151 B1 | 2/2016 | Emigh et al. | |
| 9,412,120 B1* | 8/2016 | Bitoun | G06Q 30/0267 |
| 9,576,286 B1* | 2/2017 | Artman | G06Q 20/3278 |
| 9,928,493 B2* | 3/2018 | Parker | G06Q 20/202 |
| 10,032,171 B2* | 7/2018 | Yeager | G06Q 20/3223 |
| 2003/0004743 A1 | 1/2003 | Callegari | |
| 2003/0191818 A1 | 10/2003 | Rankin et al. | |
| 2004/0019571 A1 | 1/2004 | Hurwitz et al. | |
| 2004/0243519 A1 | 12/2004 | Perttila et al. | |
| 2005/0234771 A1* | 10/2005 | Register | G06Q 30/02 705/14.25 |
| 2007/0125838 A1 | 6/2007 | Law et al. | |
| 2007/0235519 A1 | 10/2007 | Jang et al. | |
| 2007/0244811 A1 | 10/2007 | Tumminaro | |
| 2008/0096579 A1 | 4/2008 | Gill | |
| 2008/0262928 A1* | 10/2008 | Michaelis | G06Q 30/02 705/14.26 |
| 2008/0280624 A1 | 11/2008 | Wrappe | |
| 2009/0076921 A1* | 3/2009 | Nelson | G06Q 20/20 705/16 |
| 2009/0204494 A1* | 8/2009 | Weinblatt | G06Q 30/02 705/14.1 |
| 2009/0327135 A1 | 12/2009 | Nguyen et al. | |
| 2010/0030578 A1 | 2/2010 | Siddique et al. | |
| 2010/0063867 A1 | 3/2010 | Proctor, Jr. et al. | |
| 2010/0082481 A1 | 4/2010 | Lin et al. | |
| 2010/0131900 A1* | 5/2010 | Spetalnick | G06F 17/276 715/825 |
| 2010/0250375 A1* | 9/2010 | Diehl | G06Q 20/02 705/17 |
| 2010/0317289 A1 | 12/2010 | Desai et al. | |
| 2011/0010291 A1 | 1/2011 | Adams | |
| 2011/0016051 A1* | 1/2011 | Trifiletti | G06Q 20/20 705/44 |
| 2011/0021142 A1 | 1/2011 | Desai et al. | |
| 2011/0076941 A1 | 3/2011 | Taveau et al. | |
| 2011/0191237 A1* | 8/2011 | Faith | G06F 1/1694 705/39 |
| 2011/0215921 A1 | 9/2011 | Ayed et al. | |
| 2011/0225057 A1* | 9/2011 | Webb | G06Q 20/20 705/16 |
| 2012/0050098 A1 | 3/2012 | Kuehnel et al. | |
| 2012/0123880 A1* | 5/2012 | Craft | G06Q 20/20 705/16 |
| 2012/0150669 A1 | 6/2012 | Langley et al. | |
| 2012/0166332 A1 | 6/2012 | Naaman | |
| 2012/0166337 A1 | 6/2012 | Park et al. | |
| 2012/0197729 A1* | 8/2012 | Bertram | G06Q 30/02 705/14.64 |
| 2012/0252418 A1* | 10/2012 | Kandekar | H04W 4/021 455/414.1 |
| 2012/0254029 A1 | 10/2012 | Layne et al. | |
| 2012/0257561 A1 | 10/2012 | Redding | |
| 2012/0258669 A1 | 10/2012 | Honkanen et al. | |
| 2012/0265623 A1 | 10/2012 | Zhu et al. | |
| 2013/0040574 A1 | 2/2013 | Hillyard | |
| 2013/0065584 A1 | 3/2013 | Lyon et al. | |
| 2013/0081119 A1 | 3/2013 | Sampas | |
| 2013/0097078 A1* | 4/2013 | Wong | G06Q 20/027 705/44 |
| 2013/0099920 A1* | 4/2013 | Song | G08B 21/023 340/539.13 |
| 2013/0103519 A1 | 4/2013 | Kountotsis et al. | |
| 2013/0106684 A1 | 5/2013 | Weast et al. | |
| 2013/0109323 A1 | 5/2013 | Ruutu et al. | |
| 2013/0144701 A1 | 6/2013 | Kulasooriya et al. | |
| 2013/0166399 A1 | 6/2013 | Awad | |
| 2013/0198076 A1* | 8/2013 | Zambelli Hosmer | G06Q 20/12 705/44 |
| 2013/0225197 A1 | 8/2013 | McGregor et al. | |
| 2013/0251216 A1 | 9/2013 | Smowton et al. | |
| 2013/0252594 A1* | 9/2013 | Faillaci | H04W 4/023 455/414.2 |
| 2013/0260690 A1 | 10/2013 | Cha | |
| 2013/0260693 A1 | 10/2013 | Un et al. | |
| 2013/0273843 A1 | 10/2013 | Shimota et al. | |
| 2013/0273906 A1 | 10/2013 | Cucala Garcia et al. | |
| 2013/0281084 A1* | 10/2013 | Batada | H04W 4/043 455/426.1 |
| 2013/0282533 A1* | 10/2013 | Foran-Owens | G06Q 30/0641 705/27.1 |
| 2013/0311798 A1 | 11/2013 | Sultenfuss et al. | |
| 2014/0001264 A1 | 1/2014 | Babu et al. | |
| 2014/0040120 A1 | 2/2014 | Cho et al. | |
| 2014/0058862 A1* | 2/2014 | Celkonas | G06Q 20/12 705/18 |
| 2014/0108241 A1 | 4/2014 | Tunnell et al. | |
| 2014/0113558 A1 | 4/2014 | Varoglu et al. | |
| 2014/0114778 A1 | 4/2014 | Miller et al. | |
| 2014/0114780 A1 | 4/2014 | Menefee et al. | |
| 2014/0122328 A1 | 5/2014 | Grigg | |
| 2014/0160978 A1 | 6/2014 | Palin et al. | |
| 2014/0172680 A1 | 6/2014 | Prabhu | |
| 2014/0172700 A1 | 6/2014 | Teuwen et al. | |
| 2014/0188708 A1 | 7/2014 | Govindarajan et al. | |
| 2014/0188733 A1 | 7/2014 | Granbery | |

(56) References Cited

U.S. PATENT DOCUMENTS

| | | | |
|---|---|---|---|
| 2014/0258132 A1 | 9/2014 | Swamy et al. | |
| 2015/0041534 A1 | 2/2015 | Rayner et al. | |
| 2015/0063472 A1* | 3/2015 | Chatterton | H04L 63/0492 375/256 |
| 2015/0073980 A1 | 3/2015 | Griffin et al. | |
| 2015/0079942 A1* | 3/2015 | Kostka | H04W 4/21 455/411 |
| 2015/0084769 A1 | 3/2015 | Messier et al. | |
| 2015/0094080 A1 | 4/2015 | Snyder et al. | |
| 2015/0112826 A1 | 4/2015 | Crutchfield, Jr. | |
| 2015/0199672 A1* | 7/2015 | Woloshin | G06Q 20/3224 705/39 |
| 2016/0086029 A1* | 3/2016 | Dubuque | G06K 9/00536 382/159 |

OTHER PUBLICATIONS

Wincor nixdorf introduces battery-powered mobile POS system; mobile system delivers extended battery life, serves multiple functions in retail stores. (May 30, 2001). Business Wire Retrieved from https://dialog.proquest.com/professional/docview/675398769?accountid=142257 on Feb. 25, 2019 (Year: 2001).*

Li, X., Gao, X., Li, X., & Gou, H. (2010). Mobile communication system for chain store operation doi:http://dx.doi.org/10.1109/ICNDS.2010.5479314 on Feb. 25, 2019 (Year: 2010).*

Anonymous, "aisle411 Teams with Estimote on Indoor Retail Mapping", Wireless News, (Oct. 18, 2013) pp. 1-2, Gale Accession No. 345907867, Close-Up Media, Inc., retrieved from http://dialog.proquest.com/professional/docview/1442952412?accountid=142257 on Jun. 11, 2016.

Anonymous, "NFC Forum and Bluetooth SIG Publish Developers Guide to Using NFC for Bluetooth[R] Pairing", Business Wire, (Dec. 19, 2011) pp. 1-2, Gale Accession No. 275225911, retrieved from http://dialog.proquest.com/professional/docview/911923019?accountid=142257 on Jun. 11, 2016.

Anonymous, "Research and Markets: The future of Mobile Payments 2012", Business Wire, (May 16, 2012) pp. 1-5, retrieved from https://www.thefreelibrary.com/_/print/PrintArticle.aspx?id=289820281 on Dec. 20, 2016.

* cited by examiner

WIRELESS DONGLE FACILITATED MOBILE TRANSACTIONS

RELATED APPLICATIONS

This application is a continuation of U.S. patent application Ser. No. 14/629,379, filed Feb. 23, 2015, now allowed, entitled "DONGLE FACILITATED WIRELESS CONSUMER PAYMENTS," which is a continuation of U.S. patent application Ser. No. 13/938,860, tiled on Jul. 10, 2013, issued as U.S. Pat. No. 8,972,296, which claims priority to U.S. Provisional Application No. 61/747,918, entitled "AUTOMATIC WIRELESS CONSUMER CHECKINS," filed Dec. 31, 2012; and to U.S. Design application Ser. No. 29/455,720, entitled "BLUETOOTH LOW ENERGY DONGLE DESIGN," filed May 23, 2013, issued as U.S. Pat. No. D717,309.

All above-identified patent applications and patents are hereby incorporated by reference in their entireties.

TECHNICAL FIELD

The present disclosure relates generally to systems and devices that facilitate consumer transactions, and more particularly to systems and devices for consumer transactions that utilize the personal mobile devices of consumers.

BACKGROUND

Computer systems and networks can facilitate the tasks of buying, selling and transferring goods, as technology advances have allowed for a wider variety of devices and transaction types in the retail and other marketplaces. One example of a relatively new development within the realm of electronic commerce is the ability to allow a consumer to pay for a good or service at a point of sale through the use of his or her smart phone, tablet, laptop computer, or other personal mobile device. A user merely needs to have an appropriate mobile payment application or "app" on his or her device, whereupon the user can present his or her smart phone or other similar device at an appropriate time and location at a retail or other establishment. The retailer or other seller or service provider can then "check in" the given user through some process of reading his or her smart phone or other similar device, after which the seller or service provider can accept payment or credit through some form of communication with the checked in or acknowledged device.

Unfortunately, such setups are not without their own drawbacks and inconvenient features. In many instances, the current check in process can be time consuming. For example, current check in procedures often require the customer to take out his or her smart phone or other device at a point of sale in order to make a payment or provide a credit. This often involves the device searching for the appropriate wireless connection at the store, searching for the store among many possible choices on the device, and/or manual user input or selection on his or her personal mobile device, all of which can take some inconvenient amount of time. Even small amounts of time that are less than a minute can be frustrating where other consumers are waiting in line behind the user at a register or other point of sale.

Although many systems and methods for facilitating consumer payments using personal mobile devices have generally worked well in the past, there is always a desire for improvement. In particular, what is desired are systems and methods that provide for faster or more convenient check ins and payment processing where smart phones or other personal mobile devices are used to facilitate consumer transactions.

BRIEF DESCRIPTION OF THE DRAWINGS

The included drawings are for illustrative purposes and serve only to provide examples of possible systems and methods for the disclosed dongle facilitated wireless consumer payments. These drawings in no way limit any changes in form and detail that may be made to that which is disclosed by one skilled in the art without departing from the spirit and scope of this disclosure.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The present invention relates in various embodiments to devices, systems and methods involving activities with respect to the purchase of goods or services, such as in a retail setting. In various particular embodiments, the subject devices, systems or methods can involve one or more user devices in communication over a network. Such a network can facilitate the improved and purchase of goods or services, such as through a more robust use of a smart phone, tablet, laptop or other personal mobile device. The subject systems or methods can utilize programs and/or associated hardware on user phones and other mobile devices to facilitate the automated check ins of users when they are at a cooperating or subscribing location. Users that have been automatically checked in by such a system can then more readily pay or provide credit for goods or services at a point of sale in the establishment.

While the various examples disclosed herein focus on particular aspects regarding the purchase of goods or services in a retail or similar setting, it will be understood that the various inventive principles and embodiments disclosed herein can be applied to other types of applications and arrangements involving consumer or personal transactions as well. For example, the various aspects and features with respect to automated check ins and transaction processing disclosed herein can also take place at a taxi cab or other transportation vehicle, fast food or other drive through, coffee shop, self-service gas pump or other gas station application, library, private club, public venue or government building, among other possible applications.

Systems and Devices

Figure 1:
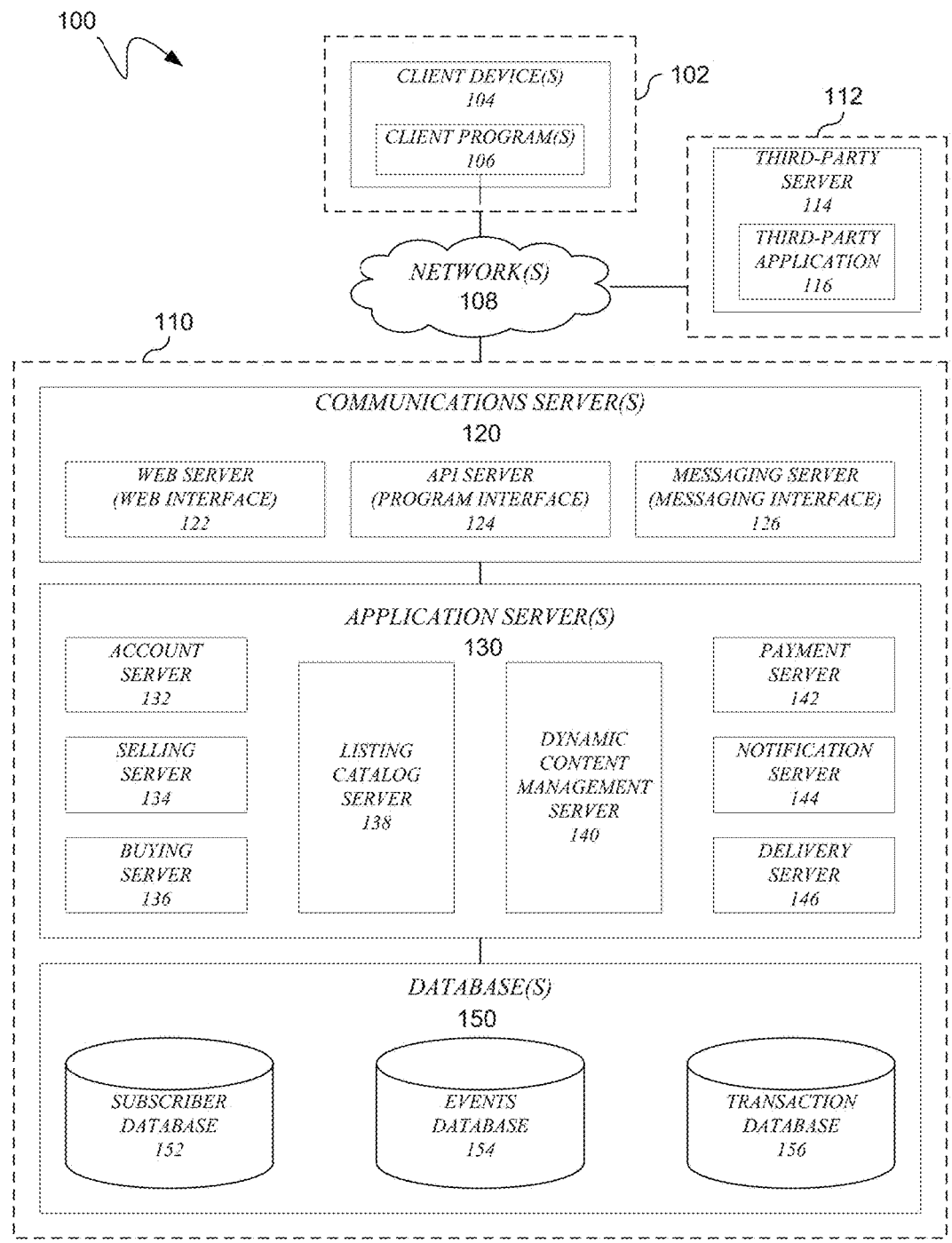
FIG. 1 illustrates in block diagram format an exemplary computing system adapted for implementing the purchase of goods or services according to one embodiment of the present invention.

Beginning with FIG. 1, an exemplary embodiment of a computing system adapted for implementing the purchase of goods or services is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a laptop, a mobile computing device, a PC, and/or any other computing device having computing and/or communications capabilities in accordance with the described embodiments. In particular, it is specifically contemplated that client devices 104 can include a cellular telephone or other similar mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

In various embodiments, computing system 100 can include, among other elements, a third party 112, which may comprise or employ a third-party server 114 hosting a third-party application 116. In various implementations, third-party server 314 and/or third-party application 116 may host a web site associated with or employed by a third party 112. For example, third-party server 114 and/or third-party application 116 may enable network-based system 110 to provide client 102 with additional services and/or information, such as advertisements or promotions regarding sale items. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplace and/or purchasing services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an online goods and services marketplace, application servers 130 of network-based system 110 may provide various online marketplace services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide such online marketplace services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
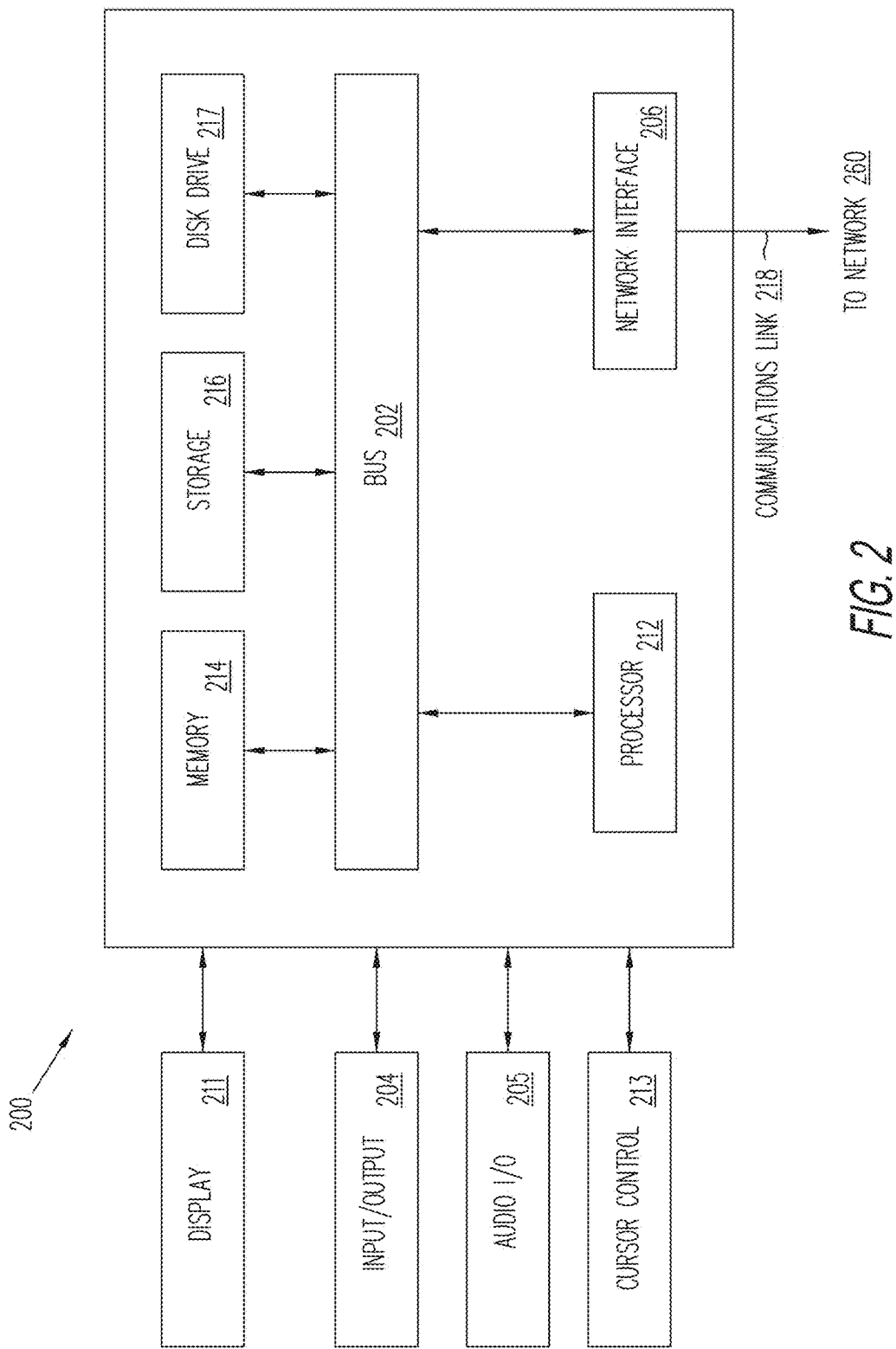
FIG. 2 illustrates in block diagram format an exemplary computer system suitable for implementing on one or more devices of the computing system in FIG. 1 according to one embodiment of the present invention.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, PDA, Bluetooth device, key FOB, badge, etc.) that is capable of communicating with a network. The goods or services provider may utilize a network computing device (e.g., a network server) capable of communicating with the network. It should be appreciated that each of the devices utilized by users, goods and services providers, and payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both.

Automated Wireless Transactions

As will be readily appreciated, the foregoing networks, systems, devices, methods and variations thereof can be used to implement an automated checkin of users at a cooperating or subscribing establishment, such that subsequent purchase transactions and other activities can be more streamlined and convenient. Rather than having users resort to known procedures involving wireless checkins with their own personal mobile devices at a point of sale, a more user friendly system involving the use of Bluetooth Low Energy ("LE") in association with separate user phones, other mobile devices or any suitable user computing devices can be provided. One or more applications or "apps" can be provided for download and use on private consumer phones and mobile devices to help facilitate the use of the automated checkin process. In various embodiments, such automated checkins can be facilitated by a transaction service provider, such as, for example, PayPal Inc. of San Jose, Calif.

Bluetooth low energy ("BLE") is a relatively new feature of Bluetooth 4.0 wireless radio technology. BLE is intended for primarily low-power and low-latency applications for wireless devices within a short range, such as up to about 50 meters. Devices using BLE utilize a protocol having intermittent communications, smaller amounts of data transfer and bandwidths, as well as low duty cycles. As such, BLE can consume only a fraction of the power of traditional Bluetooth enabled products for Bluetooth communications. In many cases, BLE products will be able to operate more than a year on a tiny battery without recharging. The use of BLE can allow for a wider variety of applications in relatively low power devices, such as smart phones and other personal mobile devices.

In various embodiments, it is specifically contemplated that personal smart phones and other mobile devices that are equipped with BLE capabilities can be provided with programs or "apps" that leverage the use of these capabilities to allow for the automated checkins of owners or users carrying those devices when they are merely in or at a participating establishment. BLE allows for constant passive scanning for Bluetooth peripherals. A suitable program or app on a user device can be set to run constantly in the background under a BLE protocol, always monitoring for a significant change in location and/or presence of an appropriate BLE peripheral or "beacon" at a merchant or vendor. When the owner or user of the phone or personal mobile device enters a store or other participating location, he or she would pass by a BLE peripheral or beacon by the entrance or at some other appropriate location. This merchant or third party run BLE peripheral can be sending out a signal, such as for advertising a checkin service with a universally unique identifier ("UUID") and store information. The BLE dongle, beacon or other peripheral can be a specific type of dongle in various applications, as set forth in greater detail below.

It is worth noting that the communication process between the merchant dongle or other beacon and the purchaser smart phone or other mobile device can take place on an unbonded channel. This is significant in that the communications between the devices actually involve a financial transaction, the details of which can be detected by any party due to the unbonded nature of the communication. While the use of an unbonded channel provides greater speed and flexibility for the use of many different devices, certain precautions should be taken to protect the sensitive nature of the financial or other consumer transaction. This can be accomplished by providing UUIDs and tokens for the devices to identify each other only in a generic fashion, with all sensitive information being retained remotely by a financial processing entity or other service provider. Also, since communications take place over unbonded channels, there is no reason for a device to retain long term specific identifiers or information that is typically needed for bonded communications.

In practice, the smart phone or other mobile user device would wirelessly detect or "see" this outside BLE peripheral or beacon as the devices are in proximity with each other. The peripheral or beacon can be a dongle, as set forth below, and detection can be had due to the constant background running of the app under a BLE protocol. Once detection is made at a low or lowest energy level and duty cycle, a ramp up in energy, duty cycle, and/or other operating parameters can take place so that a handshake and checkin can take place automatically between the user device and the merchant device. In particular, the privately or separately owned mobile phone or other mobile user device can connect to the service at the store, merchant or other location, encrypt a payment token along with the UUID and write it to the service. This information could then be used directly by the merchant themself, or alternatively passed by the peripheral or other component up to a remote third party payment provider, such as for example, PayPal. The third party provider can then execute a checkin at the establishment on behalf of the customer or user. Later, when the customer or user approaches a checkout aisle or other point of sale, another BLE peripheral advertising a checkout service can be present. Various checks and processes can then take place based on the transmit power and received power of the BLE peripheral, mobile user device, or both, and the phone or other mobile device can again write credentials to the checkout service. This associates the customer with a particular register. Checkout can then proceed as normal for a checkin payment.

In order for the actual handshake and communication between the dongle or beacon and the user mobile device to be effective over an unbonded channel, it is important that both devices already be initialized and signed up for the same remote third party service provider, such as Paypal or any other suitable provider. Each device can then be provided with public encryption keys, private encryption keys and payment tokens prior to meeting each other, such that the devices are able to recognize each other as belonging to the proper service when the signals are detected and the handshake begins. Information is then exchanged purely by way of keys and payment tokens, such that no sensitive information is ever exchanged over the unbonded channel. Details of such key and token provisions, as well as the handshake process and protocols are provided below with respect to FIG. 10.

With the use of BLE and appropriate apps or programs on user devices, this entire process can be automated in many instances. This can save significant amounts of time and inconvenience for many consumers at the point of sale. In some embodiments, a beep, other sound, vibration, visual display or other output from the smart phone or other mobile user device can be provided upon automatic checkin. This can simply provide a notice to the user that they are now checked in at the establishment. Different sounds or indicators on a display can confirm to the user which establishment(s) the user is currently checked in, such as where malls or other locations having multiple vendors in a small area might be applicable. In this manner, a user can be made aware that he or she is checked in and is able to readily shop here and check out quickly.

In various further embodiments, other procedures can be implemented to take advantage of the knowledge that a user is at a given merchant location and that a purchase or other point of sale activity might be imminent. The bidirectional nature of BLE can allow for a more robust experience and interaction between the merchant, user, and/or third party payment service provider. For example, advertising and promotional offers can be directed to a known user from the merchant, the payment service provider, or both. These items can rely on a known history and other parameters applicable to the specific user. For example, notices can be provided regarding sales or promotions on items or related items that are known to be of interest or the subject of past purchases by a known user. Also, a step-up procedure to assess risk can be implemented, such that the user can be prompted for a PIN or other identifier if there is any concern over risk for that user or about a particular purchase. In addition, a customized offer of credit can be made for the user based upon various known factors in the associated customer account, history or profile. In various embodiments, a signal to the phone or device to buzz or emit a sound or display can be provided if the merchant or third party payment service provider might need a PIN or other verification at the time of purchase.

In various embodiments, the one or more processors 212 can be located on a remote server, such as a third party payment service provider server, while the display and user inputs can be located onsite at a store or other participating location, such as on a register, and/or also on a mobile user device, such as a smart phone. Processor(s) 212 can be adapted to facilitate an automatic check in process, and can be further adapted to accept and process a request to purchase goods upon checkout. Other services can be provided by processor(s) 212, such as any of the actions or services set forth herein.

Figure 3:
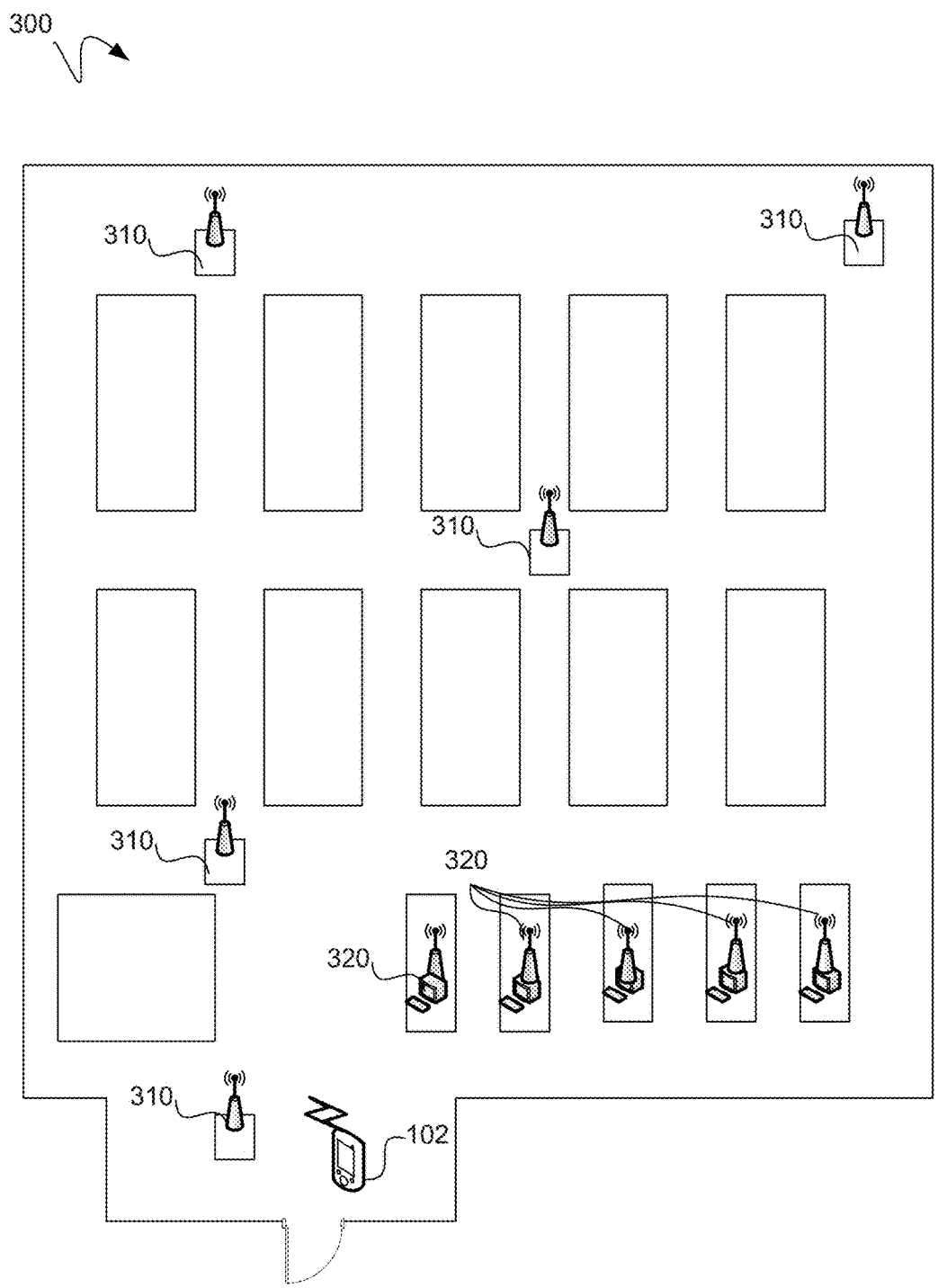
FIG. 3 illustrates in block diagram format an exemplary merchant layout and associated system components adapted for implementing the purchase of goods or services using automatic wireless consumer check ins according to one embodiment of the present invention.
Figure 4:
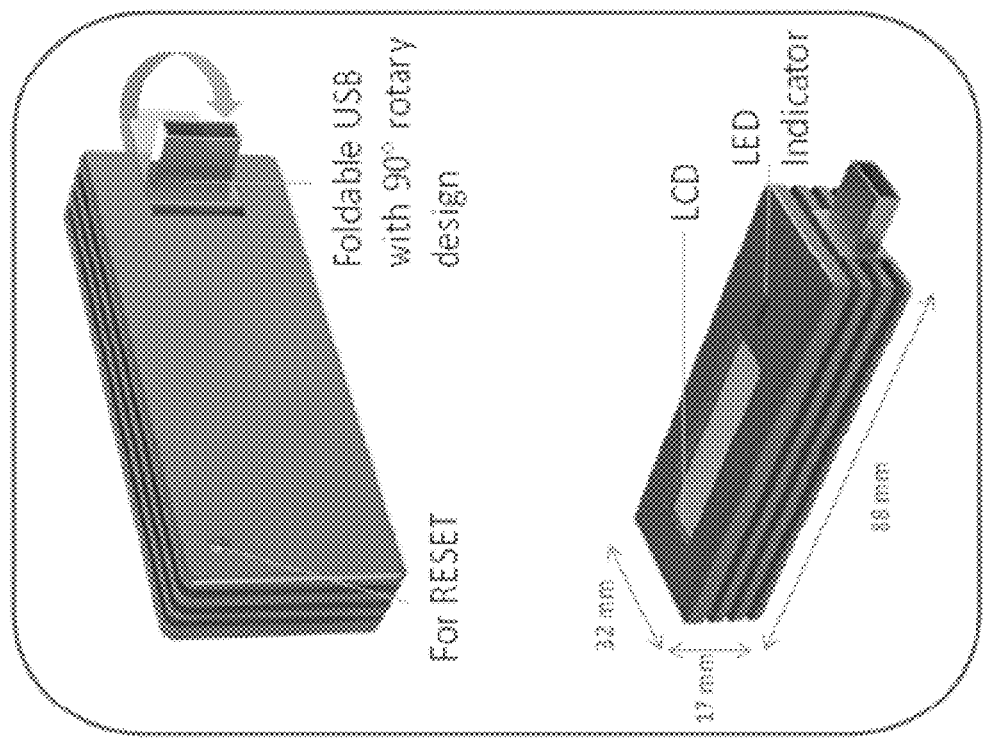
FIG. 4 illustrates in various perspective views an exemplary merchant dongle adapted for implementing the purchase of goods or services using automated wireless consumer check ins according to one embodiment of the present invention.
Figure 4:
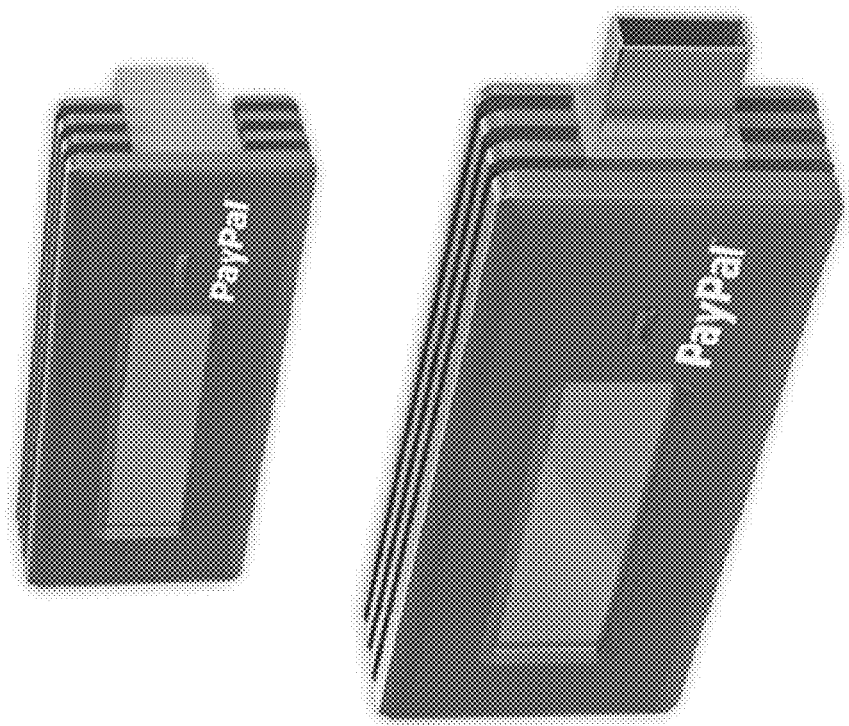
Figure 5:
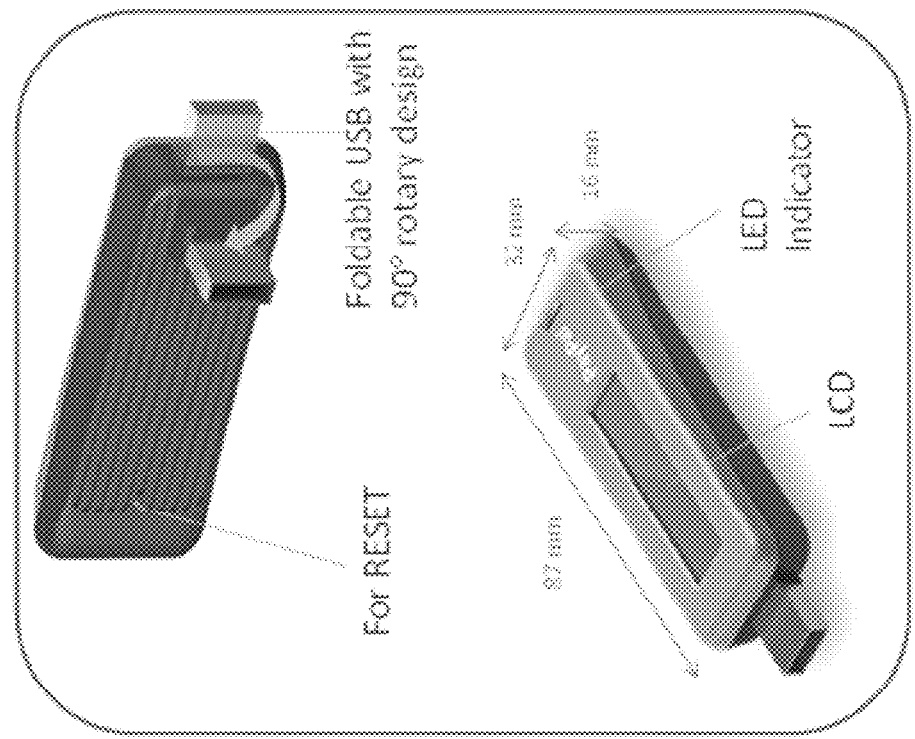
FIG. 5 illustrates in various perspective views another exemplary merchant dongle adapted for implementing the purchase of goods or services using automated wireless consumer check ins according to one embodiment of the present invention.
Figure 5:
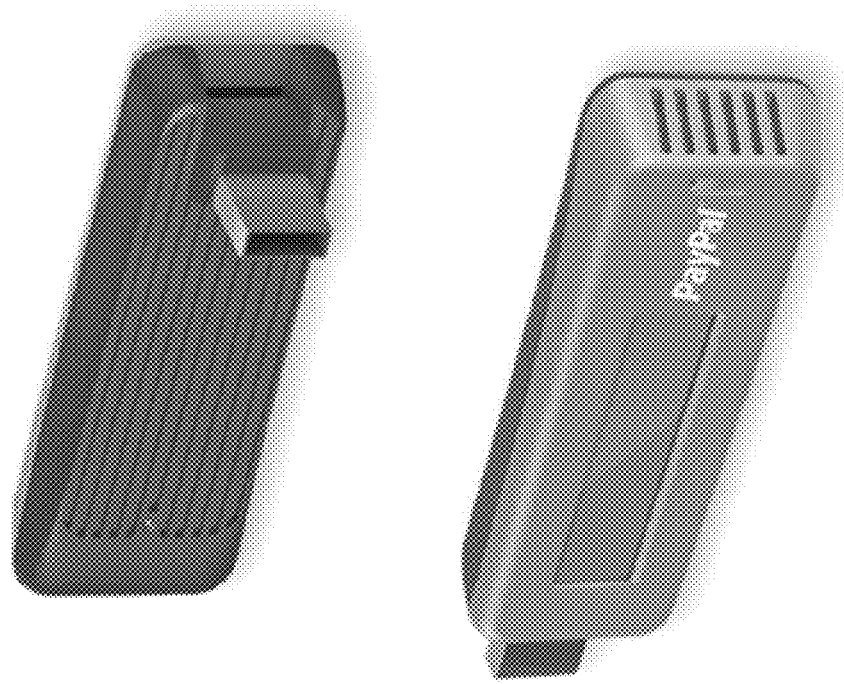
Figure 6:
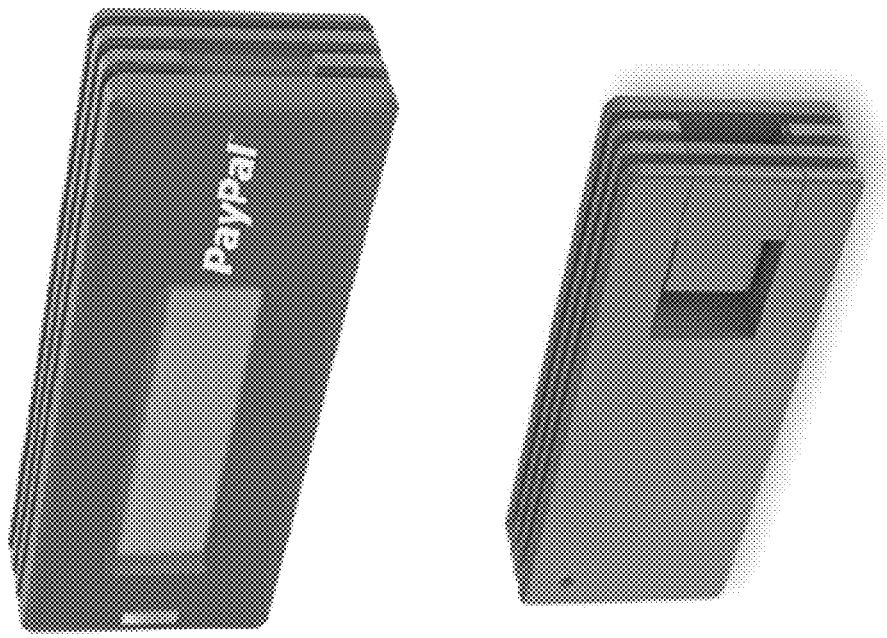
FIG. 6 illustrates in various perspective views yet another exemplary merchant dongle adapted for implementing the purchase of goods or services using automated wireless consumer check ins according to one embodiment of the present invention.
Figure 6:
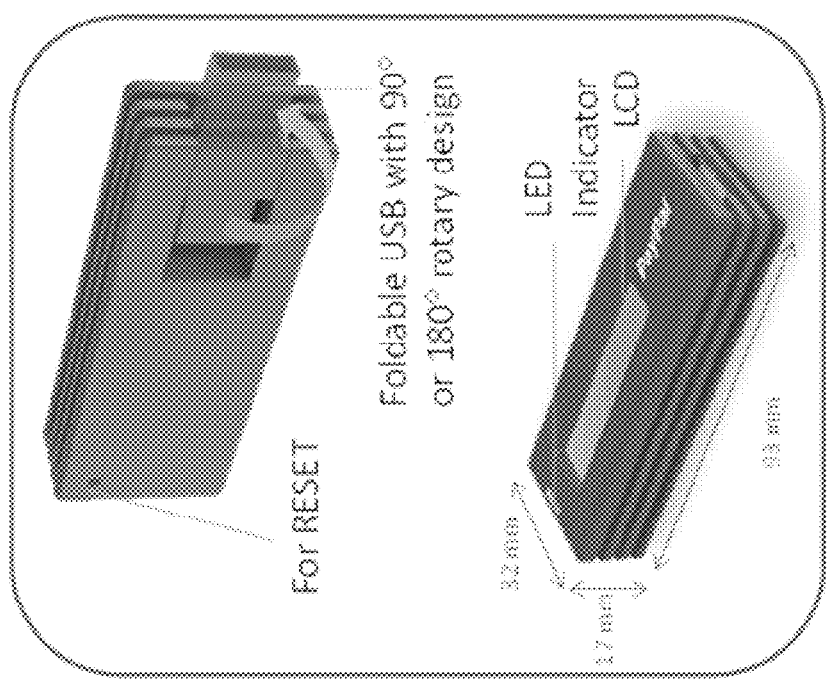
Figure 7:
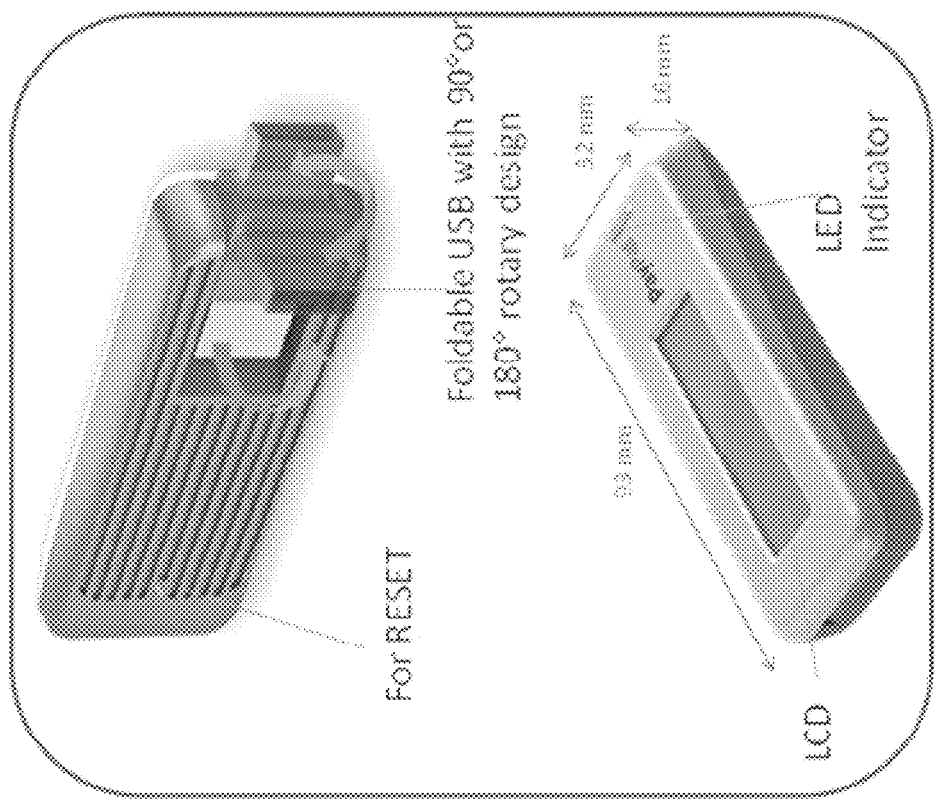
FIG. 7 illustrates in various perspective views still another exemplary merchant dongle adapted for implementing the purchase of goods or services using automated wireless consumer check ins according to one embodiment of the present invention.
Figure 7:
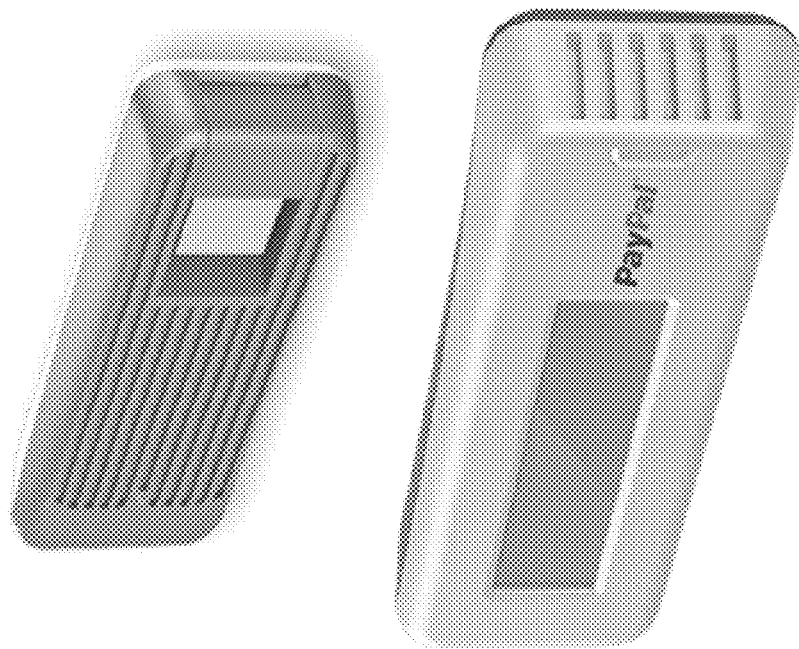

FIG. 3 illustrates in block diagram format an exemplary merchant layout and associated system components adapted for implementing the purchase of goods or services using automatic wireless consumer checkins according to one embodiment of the present invention. It will be readily appreciated that this merchant layout is only provided for purposes of illustration, and that many other types of layouts, devices, procedures and the like could be effectively implemented using the various principles of the present disclosure.

Merchant layout 300 includes an indoor store floor having a number of BLE signaling devices 310. These devices can be distributed strategically throughout the store or establishment, such as near the front door, at central locations, and/or at locations of high volume traffic within the establishment. One or more third party mobile user devices 102, such as phones, PDAs, tablets or the like, can interact with one or more of the signaling devices 310 throughout the store. Preferably, only one interaction with a signaling device 310 is needed for a checkin, although it may be useful for an establishment to know where a user is located and/or user travel and shopping patterns or habits within a store. Such further information can be used to provide further advertising and promotional offers (e.g., related to something at or near where the user is physically located), and/or to authenticate the actual user versus one who may have stolen or is otherwise using the mobile device in an unauthorized fashion. Such further authentication can involve checking known user traffic and shopping patterns against what is currently happening for a given device.

An actual automatic checkin process can involve a subscribed or affirmatively active user entering a store or establishment, whereupon the phone or other user device on the person of the user has a low level background program running that detects a low level BLE signal from one or more beacons or other suitable devices 310 in the store. The phone or device 102 can then "wake up" and communicate on a more active level with the store device 310. A UUID and token can be generated and assigned to the user device for a particular time, location and session, with appropriate expiration and other safeguards in place to protect against fraud or other misuse. For example, a period of one or two hours might suffice for a typical checkin session or event.

The UUID, token, and other informational items can be exchanged between the store device and the user device, whereupon the user device (and user) are "checked in" at that location and are ready to make a purchase or otherwise check out at some later time. Other informational items exchanged or provided can include the store type, name and number, store location or address, actual or likely items of interest or purchase for the user, a user history at that location, similar locations, and/or overall, the uniquely identified user, a maximum amount of credit or currency available overall to the user for an automated purchase, the amount of credit or currency that may be used without a PIN or other affirmative user authentication being required, among other possibilities. This information can be stored on the user device for a session or longer, can be provided to the store or other establishment, and can also be provided to a remotely owned and controlled separate payment service provider.

After checkin, various intermediate transactions, offers, credit or risk assessments can take place, whereupon check out or purchase can take place at any of a number of terminals or registers 320. If needed, authentication of the user can be had by way of a manual PIN entry, a fingerprint scan, a manual facial recognition by store personnel, and/or the like. In an automated fashion, one or more of the terminal 320 can also be equipped with BLE signaling and communication devices, such that the presence or close proximity of one or more checked in devices 102 can be read. Automated or automatic check in processes can utilize GPS, triangulation, a signal strength of the different devices 102 to different terminals, and/or the like to estimate where a particular device 102 is located in the check out process.

In some embodiments, a display readout of several possible devices can be presented to store personnel, such that the right device or user can be readily picked from a subset of all presently checked in devices and customers. For example, the 3 or 5 most likely devices/users for a given checked in customer that is trying to check out can be presented on a terminal 320 for a store clerk. A quick verification of the correct device/user can be made by the clerk, whereupon the final payment and check out process is quickly consummated and finished. In the event that the small subset of 3 or 5 most likely devices does not have the correct device for the customer that is immediately before the clerk, an available input can allow the clerk to expand the possible number of likely choices to 10, 20 or even all currently checked in devices. In the event that the present customer/user/device can still not be found on the menu of selections available to the clerk, then a re-checkin process can take place at the terminal 320 itself.

Bluetooth Low Energy Dongle

As will be readily appreciated, the actual BLE beacon can be a dongle that merchants are able to implement in order to help facilitate consumer transactions having zero "friction" (i.e., no interaction or effort needed from the consumer, other than to be carrying a smart phone or other suitable device). The consumer device can be carried in a pocket, purse or other convenient location, and does not need to be accessed by the user in order for the check in and transaction processing to occur. Such convenience is highly advantageous over many other current ways of attending to consumer transactions.

FIGS. 4-7 each illustrate in various perspective views different exemplary merchant dongles adapted for implementing the purchase of goods or services using automated wireless consumer check ins according to one embodiment of the present invention. As shown, such dongles can be equipped with USB type connections, and such connections can pivot, slide, swivel or otherwise function in a manner so as to facilitate installation. In some embodiments, such USB connections are simply there to provide power to the beacon or dongle. A USB to AC adaptor may also be provided, and/or a battery may be used for providing power, as may be desired.

Figure 8:
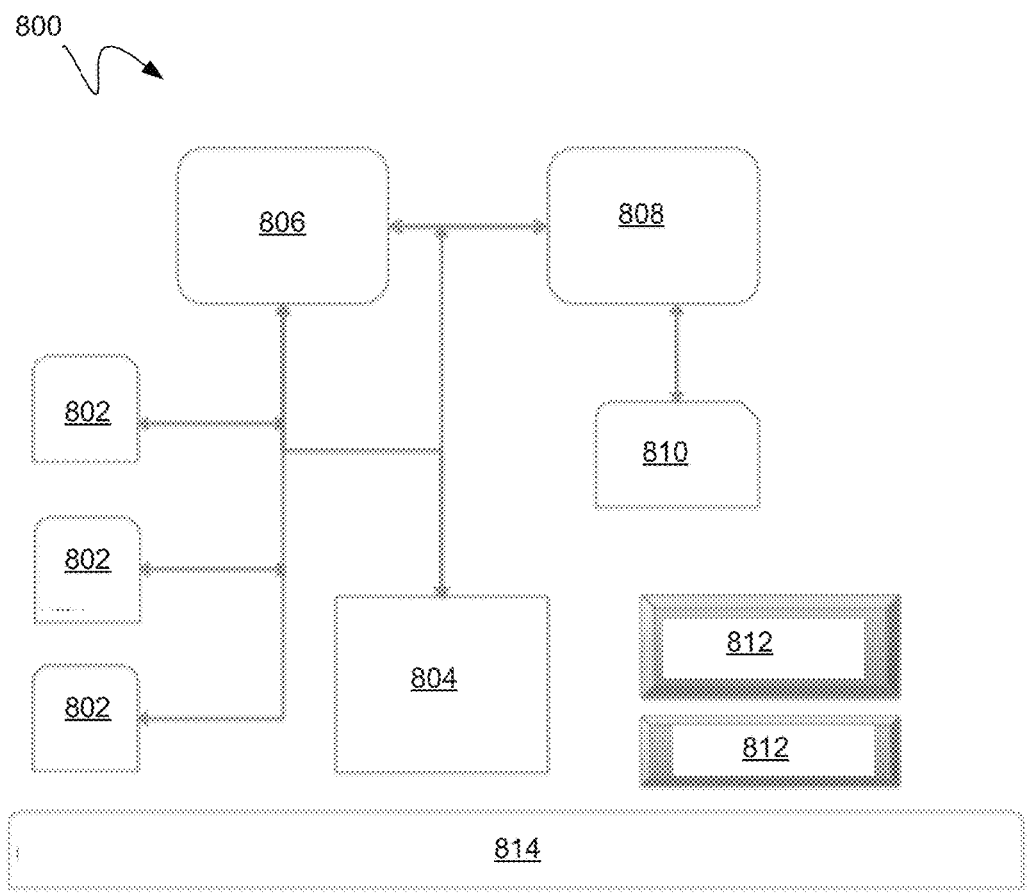
FIG. 8 illustrates in block diagram format an exemplary internal layout for a merchant dongle adapted for implementing the purchase of goods or services using automatic wireless consumer check ins according to one embodiment of the present invention.

FIG. 8 illustrates in block diagram format an exemplary internal layout for a merchant dongle adapted for implementing the purchase of goods or services using automatic wireless consumer check ins according to one embodiment of the present invention. As shown, various components of the dongle 800 can include memory components 802, processors 804, a WiFi interface 806, a BLE interface 808, a USB connection 810, various displays 812 and a power source 814.

Use Examples

While the foregoing devices, systems and methods can be applied at a retail store or outlet, many other specific examples and applications are also contemplated. For example, the disclosed wireless consumer transaction systems and methods can take place in or about a taxi cab or other mode of transportation. In such instances, a user wishing to use a cab or other transportation can get into the cab or other vehicle with his or her smart phone or other suitable device, whereupon a BLE beacon in or about the cab or other suitable vehicle can connect with the user device. Again, such a connection can involve a handshake and communication between the beacon and the third party device, such as over an unhanded channel as set forth above. Such a financial transaction for a ride or other transportation mode can be processed with zero friction or effort to the user.

As another specific example, a drive through can be equipped with a BLE beacon so as to process consumer transactions with zero friction in a similar manner. Such a drive through can be for fast food, coffee, or other suitable environments where consumer transactions take place. The BLE beacon can be provided in a matrix setup such that the appropriate driver can be identified and authenticated for payments with no effort on the part of the purchasing driver.

As yet another specific example, gas and other fueling stations can also be equipped with BLE beacons. These can be placed at or near the register or other locations within a store or other central location, as well as at one or more of the individual fuel pumps. A user can then pump gas without needing to swipe a card or perform any other action at the pump, such as by being identified and authenticated by way of the processes set forth above. Again, a matrix mode may be used if desired to achieve better accuracy in attributing purchases to the right persons.

Methods

Figure 9:
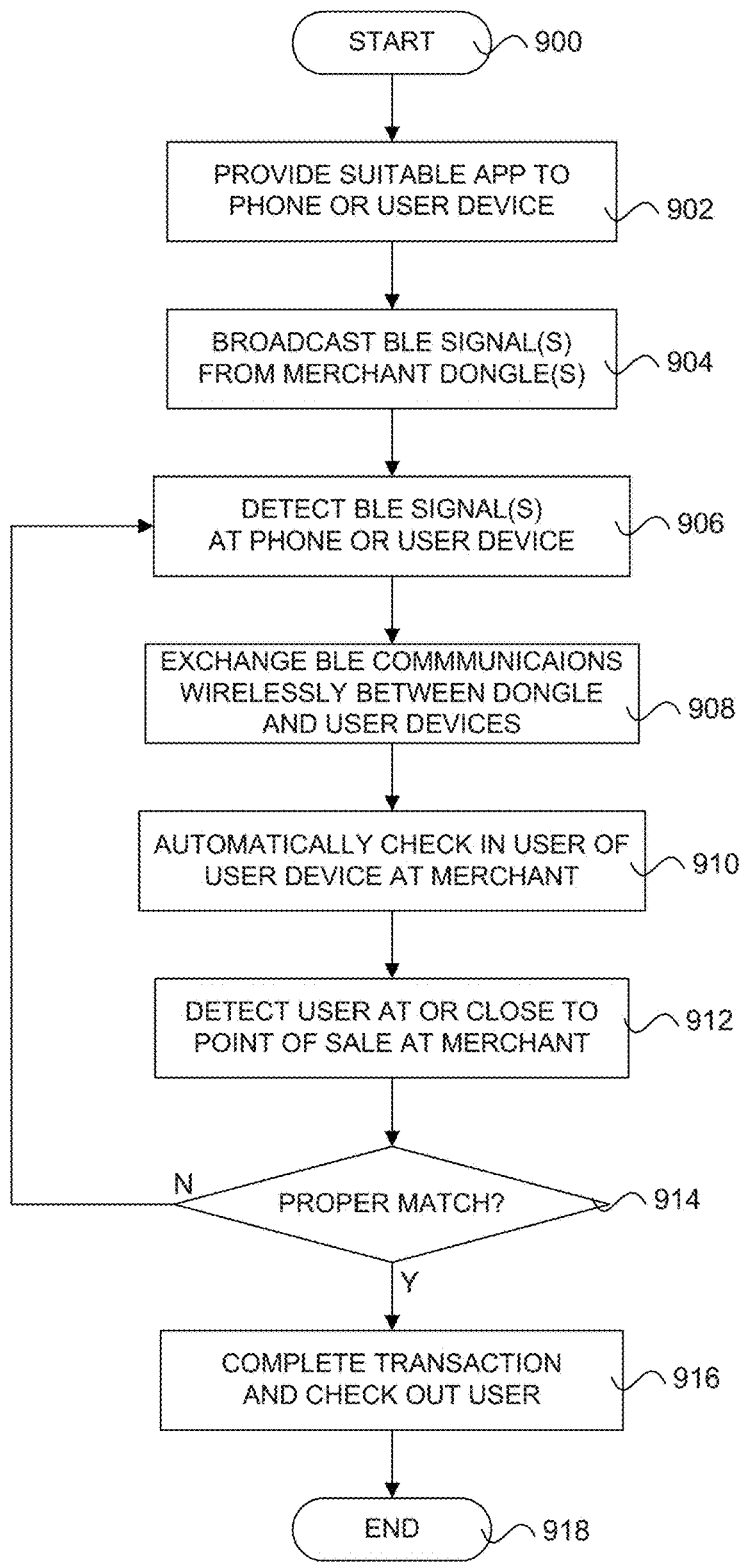
FIG. 9 provides a flowchart of an exemplary method of facilitating payment or credit for a purchase by utilizing an automated wireless consumer check in according to one embodiment of the present invention.

Although a wide variety of applications and methods involving the use of BLE to facilitate automatic wireless consumer checkins and transaction processing might be envisioned, one basic method is illustrated here. Turning next to FIG. 9, a flowchart of an exemplary method of facilitating payment or credit for a purchase by utilizing an automated wireless consumer check in is provided. In particular, such a method can involve using or operating any of the various computing components, devices, systems and/or networks described above. It will be readily appreciated that not every method step set forth in this flowchart is always necessary, and that further steps not set forth herein may also be included. Furthermore, the exact order of steps may be altered as desired for various applications.

Beginning with a start step 900, a first process step 902 can involve an application, app or other suitable program being provided to a third party user phone or other mobile computing device. Such providing can be performed electronically by a processor, such as on a separately owned server located remotely from the mobile device user. As will be readily appreciated, this providing can be facilitated by the remote processor, such as through an app store or other processor or server owned by another separate party that communicates directly with third party mobile phones and user devices. The app or program can include software code to run a number of functions, including code or information regarding automatic wireless checkins using the phone or other personal mobile device.

At a subsequent process step 904, suitable BLE signals can be broadcast from one or more merchant controlled devices at a suitable store, merchant or other participating establishment. Such signals can be broadcast by one or more dongles, for example. At least one of these BLE signals can then be detected by the third party smart phone or other suitable device when it comes within range of the BLE signals at process step 906. Again, this detection can be accomplished by enabling the third party phone or other mobile computing device to utilize a Bluetooth low energy protocol to detect the presence of a nearby merchant device using the provided software code. This detecting can occur automatically without any affirmative action by the user, as the program or app can run continuously or semi continuously or intermittently in automated fashion in the background and at low energy and bandwidth levels under a BLE protocol.

At the next process step 908, a wireless communications exchange between the third party phone or mobile computing device and the nearby dongle or other merchant device can take place. Such an exchange can involve a handshake, UUID assignment, exchange of pertinent information and the like, as will be readily appreciated by one of skill in the art. Again, said exchange can occur automatically without any affirmative action by the user of the phone or mobile device. Upon a proper exchange and verification of information, a following process step 910 can involve the owner or user of the phone or other mobile device being checked into the merchant, either on the merchant computer system, on a remote payment service provider system, or both. Again, this checking in of the user or owner of the user device takes in automatically without any affirmative action by the user.

Additional process steps after checkin can then take place as a result of the automatic checkin. For example, a next step 912 can involve detecting the user approaching, waiting in line, and/or trying to pay at a register or other point of sale at the merchant or other participating establishment. This step effectively detects the previously checked in user device, which is now close to or in the process of making a purchase or otherwise checking out. A proper matching inquiry can take place at the register or point of sale at decision step 914. This can involve a register, terminal or bank of same or other point of sale devices detecting numerous checked in user devices at or near a point of sale. One or more automated, manual or mixed processes can then be used to make sure that the right user is being charged for a given transaction, as noted above.

In the event that a proper match cannot be made at step 914, then the process can revert to process step 906 in order to checkin the device and user in a manner that can be used. Once a proper match (and recheckin, if necessary) is found or made at inquiry 914, then the method can continue to process step 916, where the transaction can be completed, payment or credit can be had, and the user can be checked out. The method then finishes at end step 918. Further steps not depicted can include, for example, reviewing signal strengths or other personal identifiers as part of the proper matching process at step 914. Still further steps can include providing offers or advertisements to the known user while he or she is at the participating establishment, assessing for risk in a possible transaction by the known user, extending credit offers, or requiring a PIN or other personal identifier of the user where certain transactions are determined to be more risky than less risky ones. In the event of less risky transactions, a more automated process can allow a user to check out and take goods without any further need for identification, cash, cards, payment, receipts or the like, in a very convenient and streamlined fashion.

Figure 10:
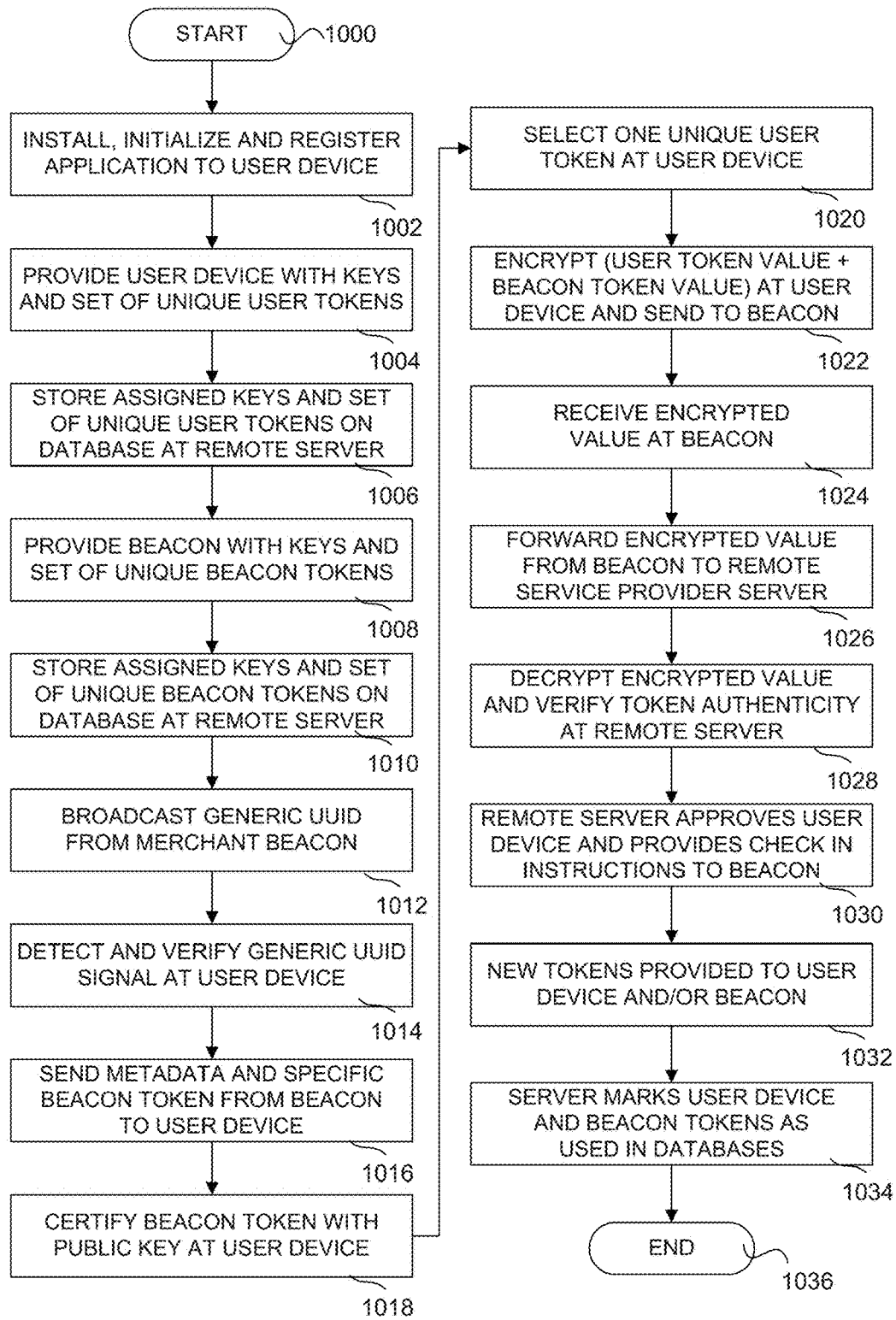
FIG. 10 provides a flowchart of an exemplary method of performing a handshake between a merchant dongle and a purchaser mobile device on an unbonded channel so as to facilitate a payment or credit for a purchase according to one embodiment of the present invention.

Turning lastly to FIG. 10, a flowchart of an exemplary method of performing a handshake between a merchant dongle and a purchaser mobile device on an unbonded channel so as to facilitate a payment or credit for a purchase according to one embodiment of the present invention. Again, such a method can involve using or operating a merchant dongle, consumer smart phone, and/or any of the other various computing components, devices, systems and/or networks described above. It will again be readily appreciated that not every method step set forth in this flowchart is always necessary, that further steps not set forth herein may also be included, and/or that the exact order of steps may be altered as desired for various applications.

Beginning with a start step 1000, a first process step 1002 is made with respect to signing up a given user device to a remote service provider, such as Paypal. This can involve installing an application on the user device, registering the user, and initializing the application with the registered user. At this point, the device can then be given a set of advance one-time use payment tokens and associated private keys at process step 1004. These user tokens can each have, for example, a user identifier, a token value, a private key serial number and an AES or other crypto key, as will be readily appreciated by one of skill in the art. Such user tokens can be assigned by a backend service provider server, such as that which might be the remote service provider noted above. At process step 1006, records of these assigned keys and user tokens are stored on database(s) at the remote service provider, such that it can be known to the provider who such a token belongs to when it is put into use.

At a following process step 1008, one or more merchant beacons can also be supplied with a set of private keys and merchant one-time use tokens. Each check-in and possible purchase or other transaction can then be tracked using a one-time token from both the user device and a merchant beacon or beacon system that checks in the user device. As in the case of the user device above, the keys and tokens for the beacon are also assigned by and stored at the remote service provider for later reference, which can be done at process step 1010. The user device and beacon are now in condition for communications, check-ins and transactions.

At a subsequent process step 1012, a generic UUID is constantly broadcast from the beacon. This UUID is detected and verified as issued by the same service provider by the user device at process step 1014. The user device and beacon then initiate communications, whereupon metadata and a specific one-time use beacon token can be sent from the beacon to the user device at process step 1016. The application on the user device can then certify the beacon token as being issued by the service provider by using a public key from the service provider at process step 1018. Assuming that the beacon token sent over is authentic, the user device then selects one of its assigned one time use user tokens at process step 1020.

At a following process step 1022, the user device then encrypts both its user token value and the beacon token value together, and then sends this encrypted value back to the beacon, where it is received at process step 1024. Again, all of these communications between the user device and the beacon can be on an unbonded channel, as any other outside device that might be listening or noting these open communications will not know what to make of the token values without any reference table that knows where those tokens were assigned. In fact, the beacon itself does not know what to make of the combined encrypted value. Rather, the beacon simply forwards this value on a back channel to the remote service provider server at process step 1026. The remote server knows what to do with these values, since it has the details of where and to whom all tokens were assigned in various tables or other storage mechanisms on its database(s).

As such, the remote server decrypts the combined encrypted value at process step 1028 and verifies the authenticity and ownership of both the user token and the beacon (i.e., merchant) token. The remote server then approves of the user device and provides affirmative check-in instructions back to the beacon at process step 1030. It is worth noting that while the communications between the user device and the beacon over BLE are unbonded, the communications between the beacon and the remote server are on a separate more protected channel. Neither the user device nor any other device need see these communications between beacon and remote server of the service provider. As the user device is then checked in and the one time use tokens for the user device and beacon are both committed to this checkin and any resulting transaction, one or more new tokens can then be optionally provided to the user device and/or the beacon at process step 1032. The remote server then marks both of these tokens as used on its databases at process step 1034, whereupon the "handshake" checkin process or method then ends at end step 1036.

In various embodiments, many respective one-time use tokens can be stored on each of the various user devices and/or beacons at any given time. Selection of a given token from the pool of possible tokens can then be random, which adds some layer of protection from potential fraud or misuse. Further, the requirements that each token be used one time only, and that the combined encrypted token values be verified by the backend provider server tends to prevent or reduce the possibility of token replay or bit fiddling by unscrupulous persons who might otherwise try to make something of the unbonded and open communications over BLE channels. Again, these tokens can be replenished one at a time as they are used and discarded or otherwise rendered unusable, such as by part of a check in process. Alternatively, or in addition, each user device and/or beacon can also request more tokens from the remote service provider server independently as needed.

Other safety mechanisms to provide better security can include expiration dates on each token, as well as a requirement that the user device be in constant communication with one or more beacons at the merchant from checkin through any checkout and purchase or other transaction. In the event that communications are lost or dropped, then a new checkin with new tokens may be required if desired for security purposes. Further, it is also worth noting that the third party user device does not need to access the private keys of any beacon. Rather, the public keys are all that are necessary for the backend server to verify and authenticate tokens for both the user device and the beacon for checkin and later transaction.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system, comprising:
   a signaling device connected to a merchant device at a location, wherein the signaling device provides a wireless communication protocol for a communication exchange between the merchant device and a mobile device of a user at the location within a wireless proximity range;
   a non-transitory memory; and
   one or more hardware processors coupled to the non-transitory memory and configured to read instructions from the non-transitory memory to cause the system to perform operations comprising:
   detecting, via a hardware communication interface, the mobile device of the user using the communication exchange with the signaling device at the location, wherein the communication exchange occurs when the mobile device is within the wireless proximity range to the signaling device;
   performing a user check-in for the user based on the detecting;
   receiving a user identifier associated with the mobile device through the signaling device using the communication exchange;
   determining an account of the user using the user identifier;
   determining a history of past purchases for the user using the account;
   transmitting, through the signaling device using the communication exchange, one or more promotional items to the mobile device based at least on the history of past purchases;
   receiving a transaction processing request for a transaction from the mobile device at the location, wherein the transaction processing request is also received by the signaling device at the location from the mobile device over the communication exchange; and
   causing a payment for the transaction using the account of the user when the mobile device is detected at the location using the communication exchange without requiring affirmative action by the user on the mobile device.

2. The system of claim 1, wherein the operations further comprise: broadcasting, through the signaling device, one or more requests to perform the user check-in.

3. The system of claim 2, wherein the one or more requests, when received by the mobile device, cause the mobile device to initiate a handshake request with the signaling device at an increased energy level.

4. The system of claim 1, wherein the causing the payment comprises:
   processing the payment from the account identified to the merchant device at the location.

5. The system of claim 1, wherein the signaling device is self-powered.

6. The system of claim 1, wherein prior to the transmitting the one or more promotion items, the operations further comprise:
   selecting the one or more promotional items based on the location and the history of past purchases.

7. The system of claim 6, wherein selecting the one or more promotional items are further based on
   a merchandise for sale identified within a predefined proximity to the location.

8. A method, comprising:
   operating a signaling device through a merchant device at a location, wherein the signaling device provides a wireless communication protocol for a communication exchange between the merchant device and a mobile device of a user at the location of a wireless proximity range;

detecting, via a hardware communication interface, the mobile device of the user using the communication exchange with the signaling device at the location, wherein the communication exchange occurs when the mobile device is within the wireless proximity range to the signaling device;

performing a user check-in for the user based on the detecting;

receiving a user identifier associated with the mobile device through the signaling device using the communication exchange;

determining an account of the user using the user identifier;

determining a history of past purchases for the user using the account;

transmitting, through the signaling device using the communication exchange, one or more promotional items to the mobile device based at least on the history of past purchases;

receiving a transaction processing request for a transaction from the mobile device at the location, wherein the transaction processing request is also received by the signaling device at the location from the mobile device over the communication exchange; and causing a payment for the transaction using account of the user when the mobile device is detected at the location using the communication exchange without requiring affirmative action by the user on the mobile device.

9. The method of claim 8, further comprising:
broadcasting, through the signaling device, one or more requests to perform the user check-in.

10. The method of claim 9, wherein the one or more requests, when received by the mobile device, cause the mobile device to initiate a handshake request with the signaling device at an increased energy level.

11. The method of claim 8, wherein the causing the payment comprises:
processing the payment from the account to the merchant device at the location.

12. The method of claim 11, wherein the transaction processing request is received wirelessly from the mobile device through the signaling device.

13. The method of claim 8, wherein prior to the transmitting the one or more promotion items, the method further comprises:
selecting the one or more promotional items based on the location and the history of past purchases.

14. The method of claim 13, wherein the one or more promotional items is further based on
a merchandise for sale within a predefined proximity to the location.

15. A non-transitory machine-readable medium having stored thereon machine-readable instructions executable to cause a machine to perform operations comprising:
providing a communication exchange between a merchant device and a mobile device of a user at a location through a signaling device at the location, wherein the signaling device is connected to the merchant device and provides a wireless communication protocol for the communication exchange over a wireless proximity range;

detecting, via a hardware communication interface, the mobile device of the user using the communication exchange with the signaling device at the location, wherein the communication exchange occurs when the mobile device is within the wireless proximity range to the signaling device;

performing a user check-in for the user based on the detecting;

receiving a user identifier associated with the mobile device through the signaling device using the communication exchange;

determining an account of the user using the user identifier;

determining a history of past purchases for the user using the account;

transmitting, through the signaling device using the communication exchange, one or more promotional items to the mobile device based at least on the history of past purchases;

receiving a transaction processing request for a transaction from the mobile device at the location, wherein the transaction processing request is also received by the signaling device at the location from the mobile device over the communication exchange; and causing a payment for the transaction using account of the user when the mobile device is detected at the location using the communication exchange without requiring affirmative action by the user on the mobile device.

16. The non-transitory machine-readable medium of claim 15, wherein the operations further comprise:
broadcasting, through the signaling device, one or more requests to perform the user check-in.

17. The non-transitory machine-readable medium of claim 16, wherein the one or more requests, when received by the mobile device, cause the mobile device to initiate a handshake request with the signaling device at an increased energy level.

18. The non-transitory machine-readable medium of claim 15, wherein the causing the payment comprises:
processing the payment from the account to the merchant device at the location.

19. The non-transitory machine-readable medium of claim 15, wherein the transaction processing request is received wirelessly from the mobile device through the signaling device.

20. The non-transitory machine-readable medium of claim 15, wherein prior to the transmitting the one or more promotional items the operations further comprise:
identifying a merchandise for sale within a predefined proximity to the location; and
selecting the one or more promotional items based on the merchandise and the history of past purchases.

* * * * *

UNITED STATES PATENT AND TRADEMARK OFFICE
CERTIFICATE OF CORRECTION

PATENT NO. : 10,380,577 B2
APPLICATION NO. : 15/269654
DATED : August 13, 2019
INVENTOR(S) : Govindarajan et al.

Page 1 of 1

It is certified that error appears in the above-identified patent and that said Letters Patent is hereby corrected as shown below:

In the Specification

In Column 12, Line 11, change "unhanded channel" to --unbonded channel--.

In the Claims

In Column 16, Line 57, delete "selecting".

Signed and Sealed this
Fourteenth Day of April, 2020

Andrei Iancu
*Director of the United States Patent and Trademark Office*